United States Patent [19]

Selby, III

[11] Patent Number: 4,827,419
[45] Date of Patent: May 2, 1989

[54] PORTABLE NAVIGATIONAL PLANNING DEVICE

[75] Inventor: Howard W. Selby, III, Boulder, Colo.

[73] Assignee: Lasertrak Corporation, Boulder, Colo.

[21] Appl. No.: 910,877

[22] Filed: Sep. 22, 1986

[51] Int. Cl.⁴ ............................................. G06F 15/50
[52] U.S. Cl. .................................... 364/443; 364/900
[58] Field of Search ............... 364/443, 420, 444, 448, 364/436, 439, 460; 73/178; 469/47

[56] References Cited

U.S. PATENT DOCUMENTS

| | | | |
|---|---|---|---|
| 3,924,111 | 12/1975 | Farris | 364/443 |
| 3,979,057 | 9/1976 | Katz et al. | 364/443 |
| 4,086,632 | 4/1978 | Lions | 364/444 |
| 4,156,912 | 5/1979 | Shigeta et al. | 364/443 |
| 4,521,857 | 6/1985 | Reynolds, III | 364/439 |
| 4,642,775 | 2/1987 | Cline et al. | 364/443 |
| 4,677,604 | 6/1987 | Selby, III et al. | 369/33 |

Primary Examiner—Parshotam S. Lall
Assistant Examiner—Thomas G. Black
Attorney, Agent, or Firm—Neuman, Williams, Anderson & Olson

[57] ABSTRACT

The present application discloses an on-demand, portable mass data storage device useful for navigational planning and other applications. One embodiment comprises a flight planning apparatus having a formatted database and a processor control system which accesses the database in response to user inputs. User inputs are prompted to be coordinated with the formatting of the database to provide for optimal accessing. Particular data records may then be retrieved from the database in response to individualized user inputs, for example, in conjunction with flight planning in which particular approach and other navigational aids must be filtered from a large volume of similar information. In the preferred embodiment, sorting of the information may be done on either a geographic or a named basis. Output of the system comprises information which the user find necessary for the particular planning application. For example, air navigation flight charts may be printed in conjunction with a trip confirmation and an FAA flight plan. Also, ready cross reference between named locations and geographical identification of those named places, such as airway intersections, may be accomplished. Additionally, real time information may be provided through direct phone links. Further, customized cartographic aids may be generated for each user application by review of data in a database and generation of a symbol for particular data records with a corresponding textual identification.

21 Claims, 14 Drawing Sheets

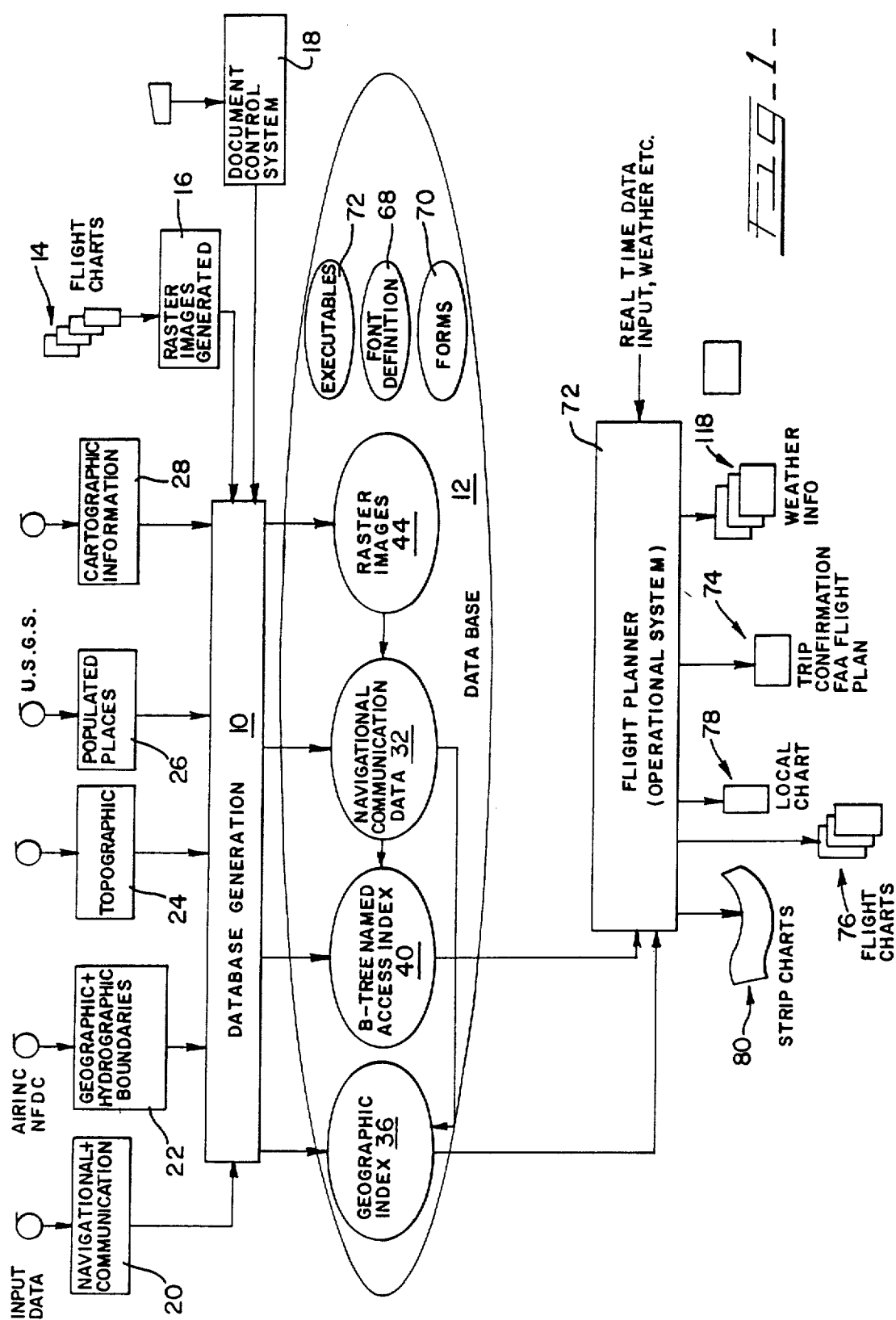

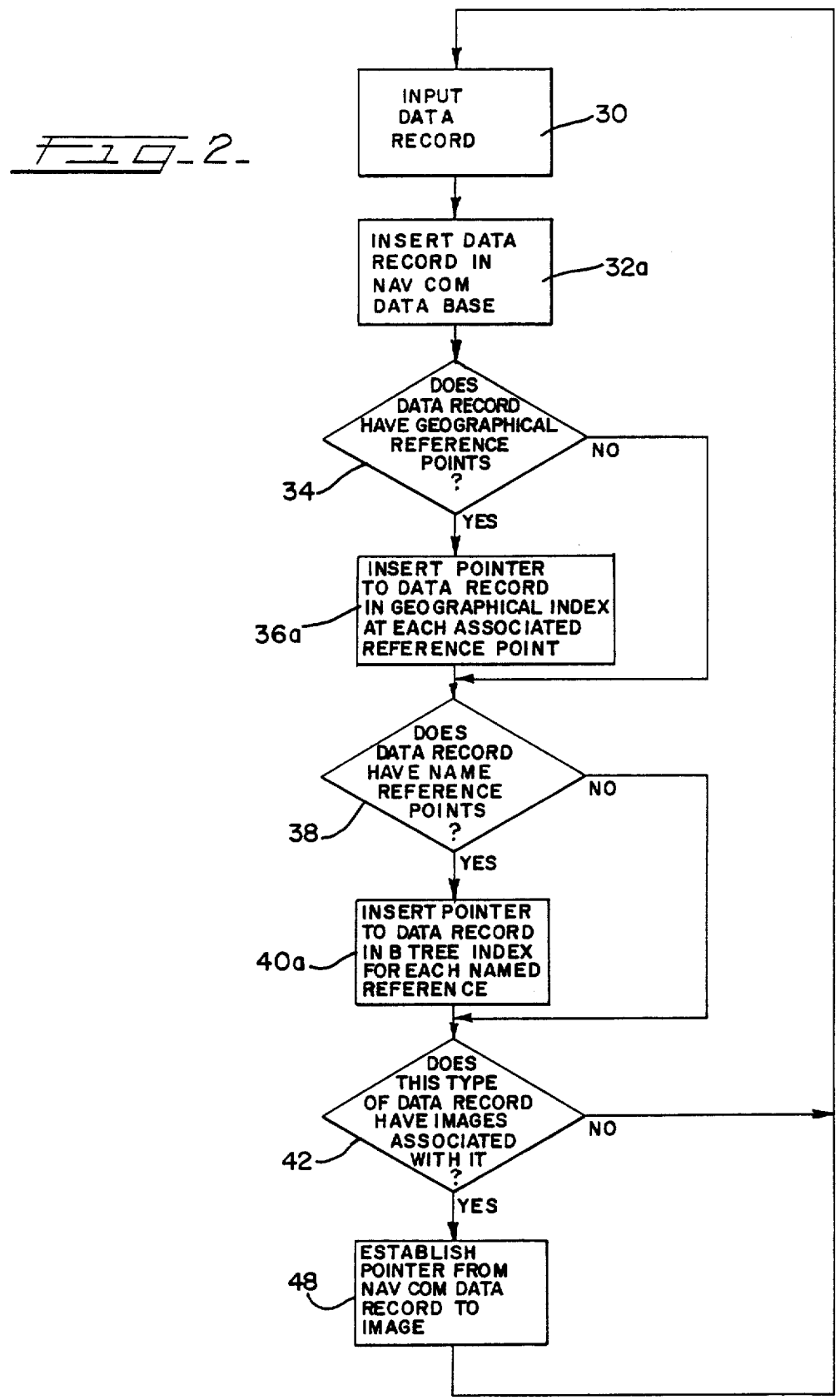

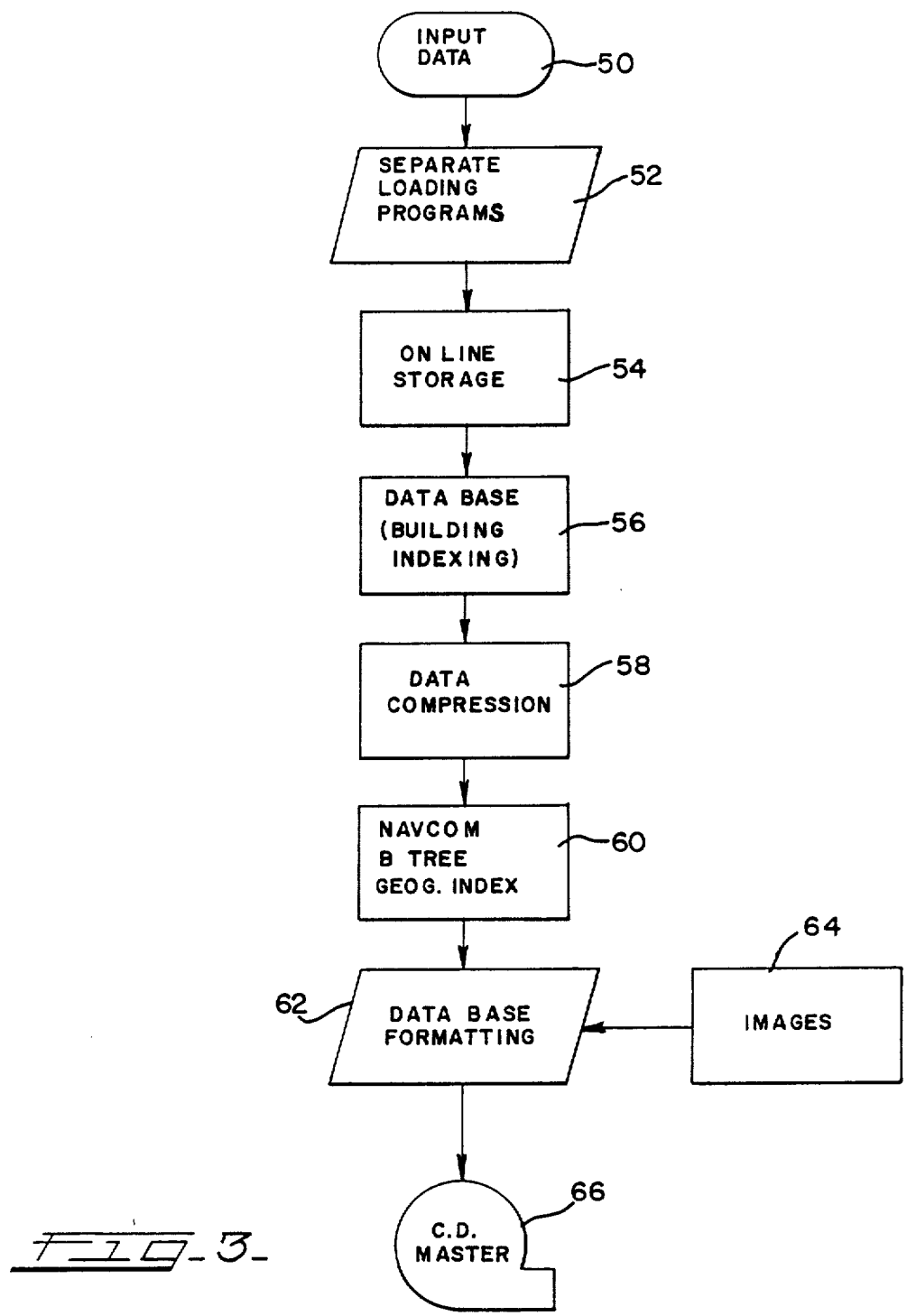
FIG_3_

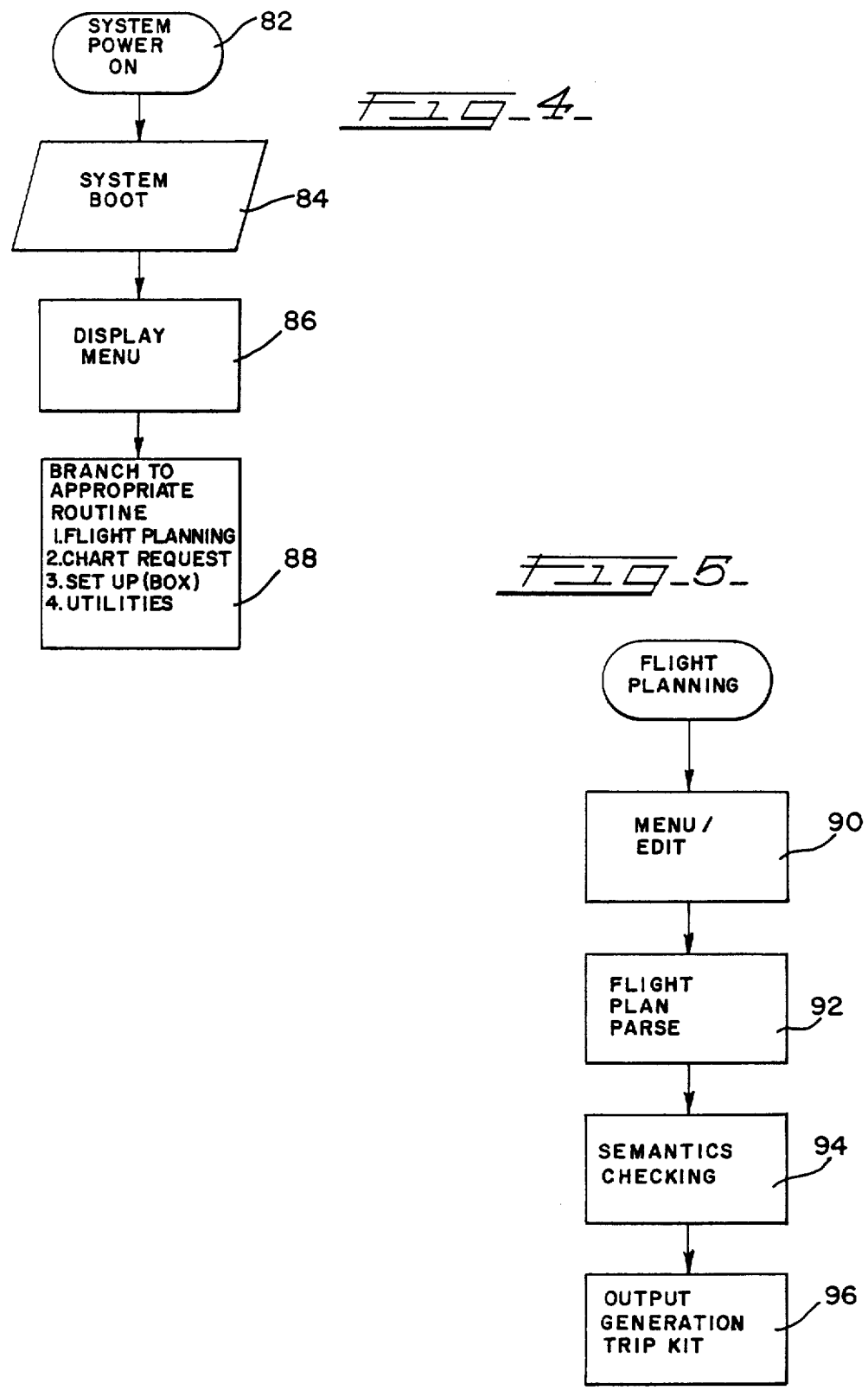

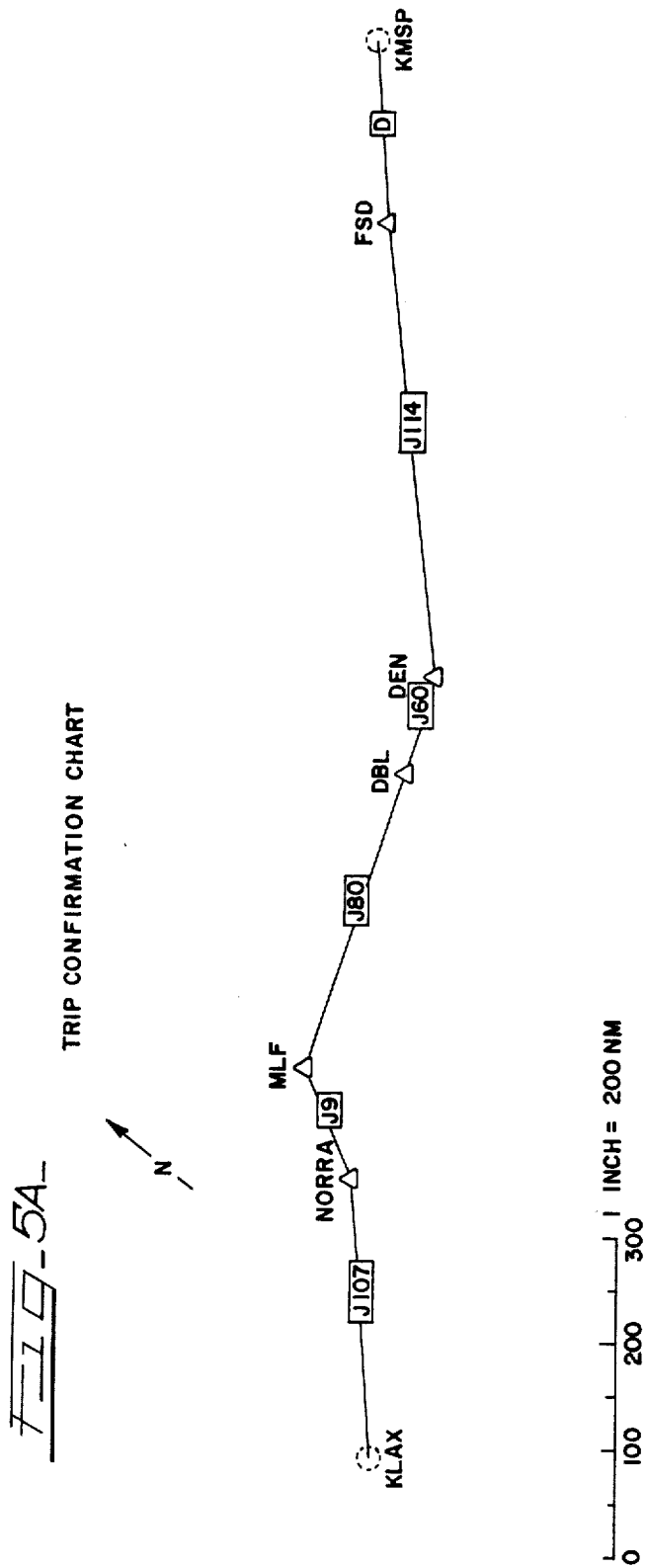

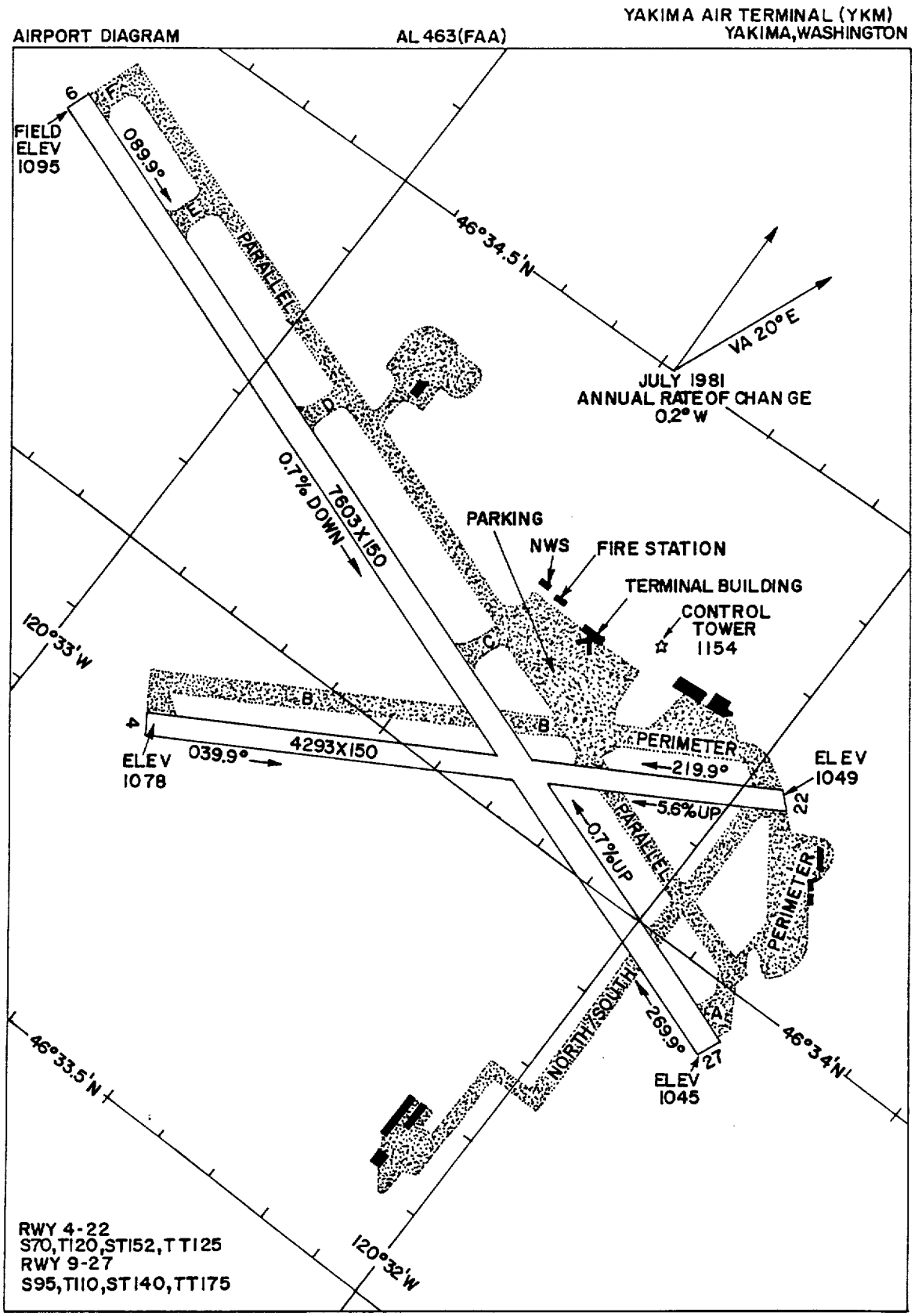

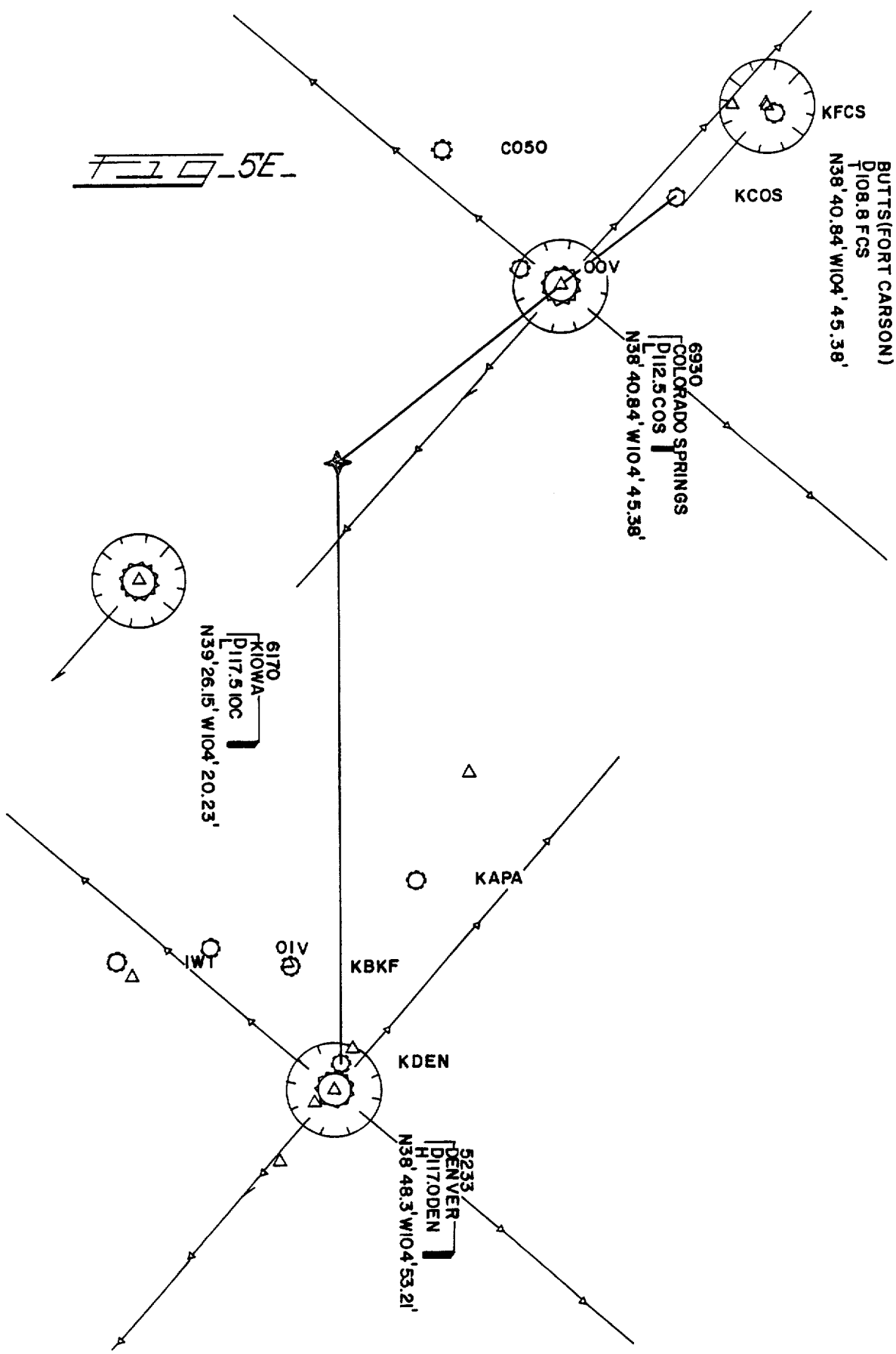

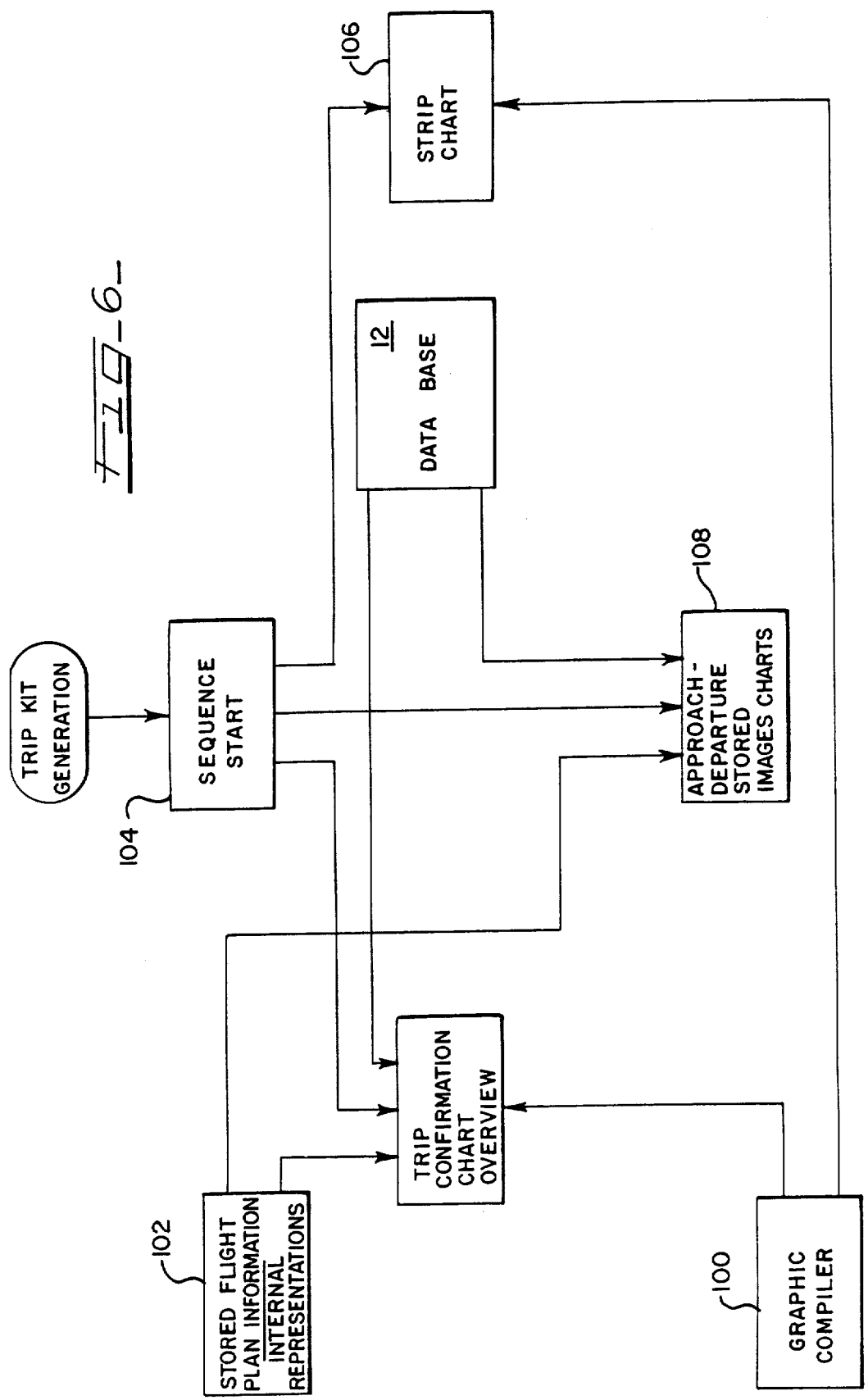

FIG_6A_
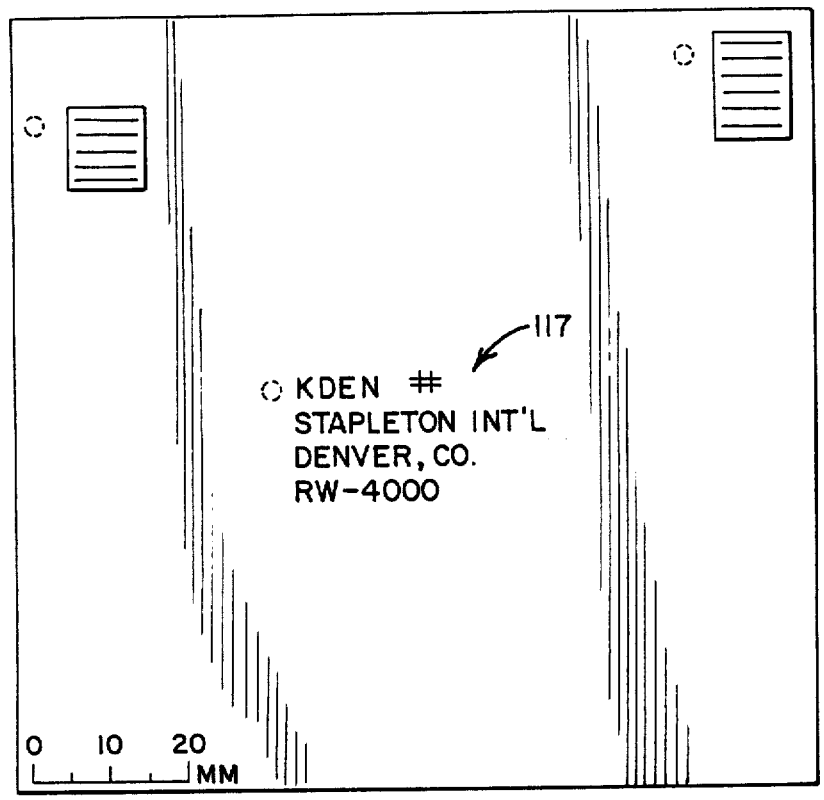

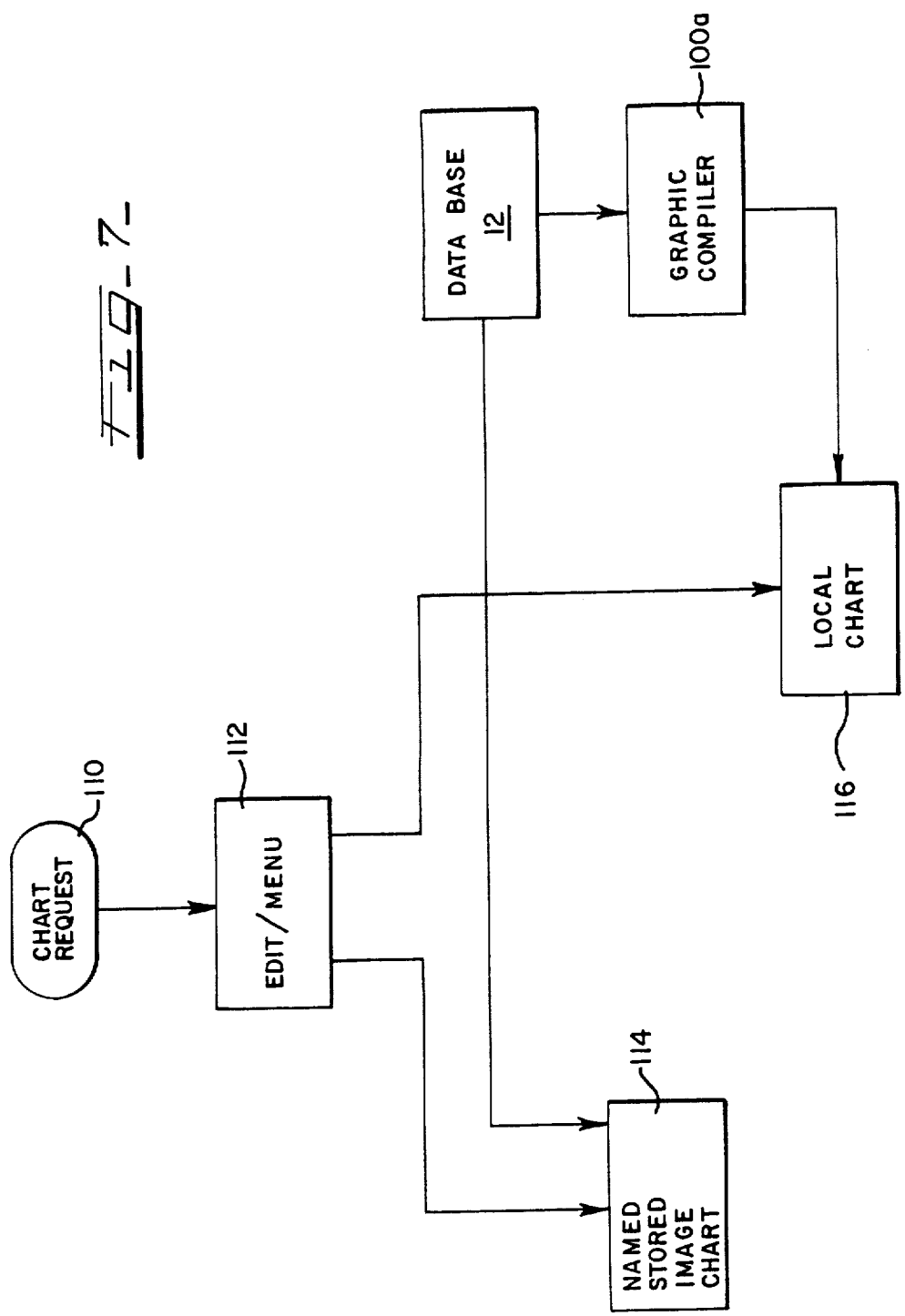

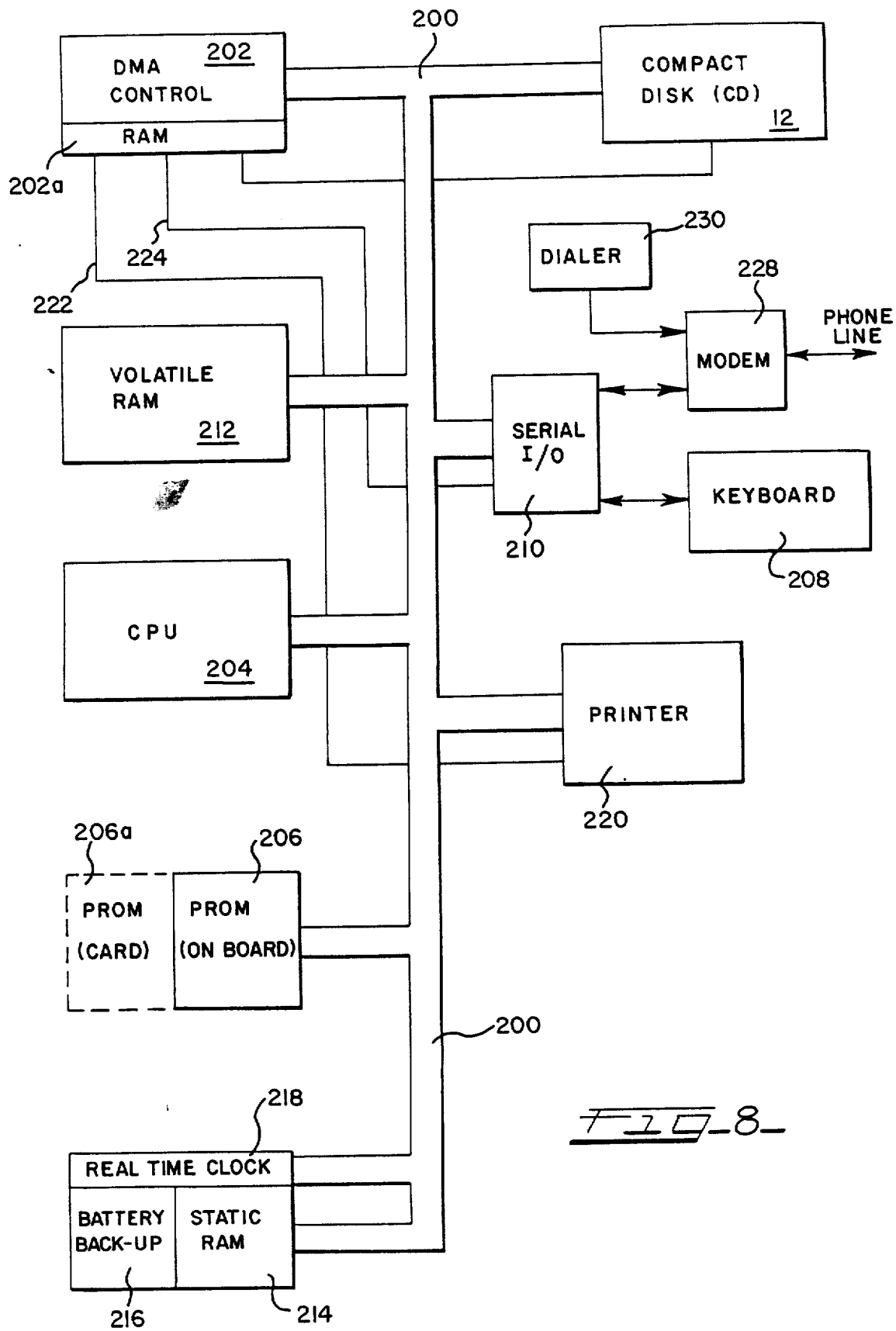
FIG_8

PORTABLE NAVIGATIONAL PLANNING DEVICE

BACKGROUND OF THE INVENTION

The present invention relates generally to the provision of mass data storage apparatus that can be frequently and easily revised, and that will produce required data of interest, from a data base, directly or in a desired, modified form on an imaging output device or in hard copy in direct response to a user inquiry in navigational planning systems. More particularly, the present invention relates to portable navigation planning requiring specific information and hands-on details, for example, flight planning and seaboard navigation, in which times, vectors, elevations, latitude, longitude and other data, including customized graphic aids, may have particular significance for the user.

Navigational planning has heretofore been done in a number of ways, many of which involve published source information requiring tedious, time consuming, manual filing and information accumulation, or otherwise require extensive information networks to process the desired data. For example, pilots have long faced the tedious task of assembling and then refiling charts and other data for their originating and arriving airports periodically, so it may be available for use as a part of the preparation for instrument flight plans.

A typical instrument flight plan as required by Federal regulation includes:

1. Type of flight plan—for example, whether the flight is intended to be flown under visual flight rules (VFR) or under instrument flight rules (IFR);

2. Aircraft identification—the complete identification (registration number) of the aircraft to be used in the specified flight;

3. Aircraft type/special equipment—abbreviated make and model designation of the aircraft and a designation appropriate for the transponder area navigation equipment available on the aircraft.

4. True air speed—the true air speed at cruise in knots of the aircraft being flown;

5. Departure point—using an identifier code or the full name of the airport for the departure airport;

6. Departure time—estimated time of departure in Greenwich Mean Time;

7. Cruising altitude—the intended final altitude or flight level;

8. Route of flight —the intended route of flight including designations of NAVAID identifier codes or names, airways, jet routes or RNAV waypoints;

9. Destination—designated by the use of an identifier code or name and location of the designation airport;

10. Estimated time in route—estimation of flight time based on latest forecast of winds, cruising altitude and power settings;

11. Remarks—any necessary clarifications to the flight plan information or notes to the Air Traffic Controller (ATC);

12. Fuel on board—estimation of fuel based on computation of typical fuel usage (reference to #10) for the aircraft in hours and minutes;

13. Alternate airport—designation by identifier code or location and name of an alternate airport for landing;

14. Pilot's name, address and telephone number and home base of aircraft;

15. Number on board—the total number of people to board the aircraft; and

16. Aircraft color—designation of the predominant colors of the aircraft.

In addition to the preparation of an FAA flight plan as outlined above, pilots operating under instrument flight rules typically must prepare or have access to a trip kit consisting of all the navigational materials necessary for both the departure and arrival airports. In addition, alternate airport and enroute emergency airport approach charts must be accumulated or made available for quick access in the cockpit.

To date, navigation charts are published by a number of services. The most popular of these is Jeppesen Sanderson, Inc. which sends looseleaf pages to its subscribers on a periodical basis to be inserted, page by page, in number of ring binders specially designed for that purpose. The pilot then must access the approach, taxi and other charts necessary and appropriate for his navigational planning in accordance with his flight plan.

The National Ocean Service (NOS) also publishes air navigation charts which are perfect bound with fifteen books to cover the country. Replacement books currently are shipped to subscribers every fifty-six days. In assembling the necessary navigational materials for a particular flight, a pilot must select those books containing the appropriate approach and other charts for the airports and alternate airports on his flight plan. In this situation, the pilot faces referencing these sometimes bulky books during flight.

Heretofore, these typical flight services have been paper oriented—that is, they have relied upon printed paper chart representations and updates of the numerous charts involved. This results in bulk (a typical Jeppesen chart set may exceed forty pounds) and tedious filing and refiling of updates and used charts with a concordant risk of misfiling or pulling incorrect charts in preparation of the flight materials.

Similar situations exist in other navigational areas and pose similar problems as face the flight navigator. For example, seaboard navigators must have ready access to reef information for any waters they intend to travel, as well as harbor or channel charts for both origin and destination harbors. Additional, particularized harbor information may also be desired or required.

Likewise, other applications such as electrical or phone network maintenance particularized, on-site, on-demand information and cartographic aids.

Accordingly, it is a principal object of the present invention to provide an on-demand system which generally overcomes the deficiencies of the prior art.

It is a more detailed object to provide a system and data retrieval method which provides for portable navigational assistance from one source in a concise and easily usable form.

It is still a further object to provide a system having data formatted for safer, quicker and more accurate access both before and during travel.

It is another object of the present invention to provide a system which requires little or no user maintenance and filing while eliminating the risk of losing or misfiling the crucial navigational aids and not having the legally required information for the intended flight.

It is still a further object to provide a system having provision for all necessary services and in addition to further desired safety and/or convenience features.

It is a specific object of the present invention to provide a flight planning navigational aid system for obtaining current weather, generating FAA rated flight plan information and navigational charts and other information that a pilot must have for instrument rated flights.

Generally, the present invention provides a portable mass data storage apparatus which may be utilized for such applications as navigational planning to provide on demand, custom, cartographic information in addition to particularized, stored data records as needed by the user. The apparatus may be frequently and easily revised and may produce required data of interest, from a database, directly or in a desired modified form on an imaging output device or in hard copy in direct response to a user request. Systems embodying the present invention generally comprise a compact data storage or memory device for storing the required information, including navigational information, to be provided to the user in a form which is directly usable by the user and particularized to each user application. An input device, such as a keyboard, communicates or cooperates with the data storage through a processor to provide selected outputs to the user at an output device, such as a CRT, LCD or printer. To provide for portability, the data storage, input, output, and processor devices should be contained within a portable cabinet structure. The processor may provide prompts to the user which are correlated to the information located in the data storage, the format of that information and the type of that information to prompt the user to make necessary selections of operating mode and output format. The processor may then respond to the user inputs to retrieve predetermined arrays of information from the data storage in a selected pattern for output. Additionally, the processor may process selected ones of the input data to provide associated information which may be unique to the input data and provide further meaning to the retrieved information. Further, the processor may respond to the input data to provide customized cartographic aids based on the information stored at the data storage.

An associated method further illustrates the application of the present invention. The portable system provides, on-demand an image or hard copy of the desired data, including a navigational plan by retrieving portions of an information database in response to selected input information. The retrieved portions may then be formatted to provide the desired navigation plan and outputted to the user in a convenient form. Additionally, the retrieved portions of the navigational information from the database may be processed to provide customized graphic representations to the user without display of the entire retrieved records from the database.

The system also may provide specific navigational information as to named locations. A user may then access navigational data by name or geographical reference and cross reference between name and geographic references.

Further specific features and objects of the present invention may become apparent in conjunction with a review of the following detailed description and accompanying drawings.

BRIEF DESCRIPTION OF THE DRAWINGS

The novel features of the present invention are set forth with particularity in the appended claims. The invention, together with the objects and advantages thereof, may be more fully understood by reference to the following detailed description taken in conjunction with the accompanying drawings in which like reference numerals are used to indicate like elements and of which:

FIG. 1 is a graphic block diagram representation of a general system according to a preferred embodiment of the present invention;

FIG. 2 is a flow chart representation of a preferred database building operation;

FIG. 3 is a more detailed flow chart representation of a database building and formatting process;

FIG. 4 is a general flow chart representation of a first user selection stage of the preferred embodiment of the present invention;

FIG. 5 is a generalized flow chart of the logic steps involved in a first, flight planning mode of a preferred embodiment of the present invention;

FIG. 5a is a sample trip confirmation chart generated in accordance with a preferred embodiment of the present invention;

FIG. 5b is a sample airport diagram chart generated in accordance with a preferred embodiment of the present invention;

FIG. 5e is a sample customized trip, strip chart generated in accordance with a preferred embodiment of the present invention;

FIG. 6 is a generalized flow chart representation of the logic steps involved in a further aspect of the flight planning mode of FIG. 5, also showing interaction with other portions of the preferred embodiment of the present invention;

FIG. 6a is a sample local chart generated in accordance with a preferred embodiment as a customized chart output of the present invention;

FIG. 7 is a generalized flow chart representation of a second, chart request mode of a preferred embodiment of the present invention, also showing interaction with other portions of the preferred embodiment; and FIG. 8 is a block diagram representation of a hardware implementation of a preferred embodiment of the present invention.

DESCRIPTION OF THE PREFERRED EMBODIMENT

Figure 5C:
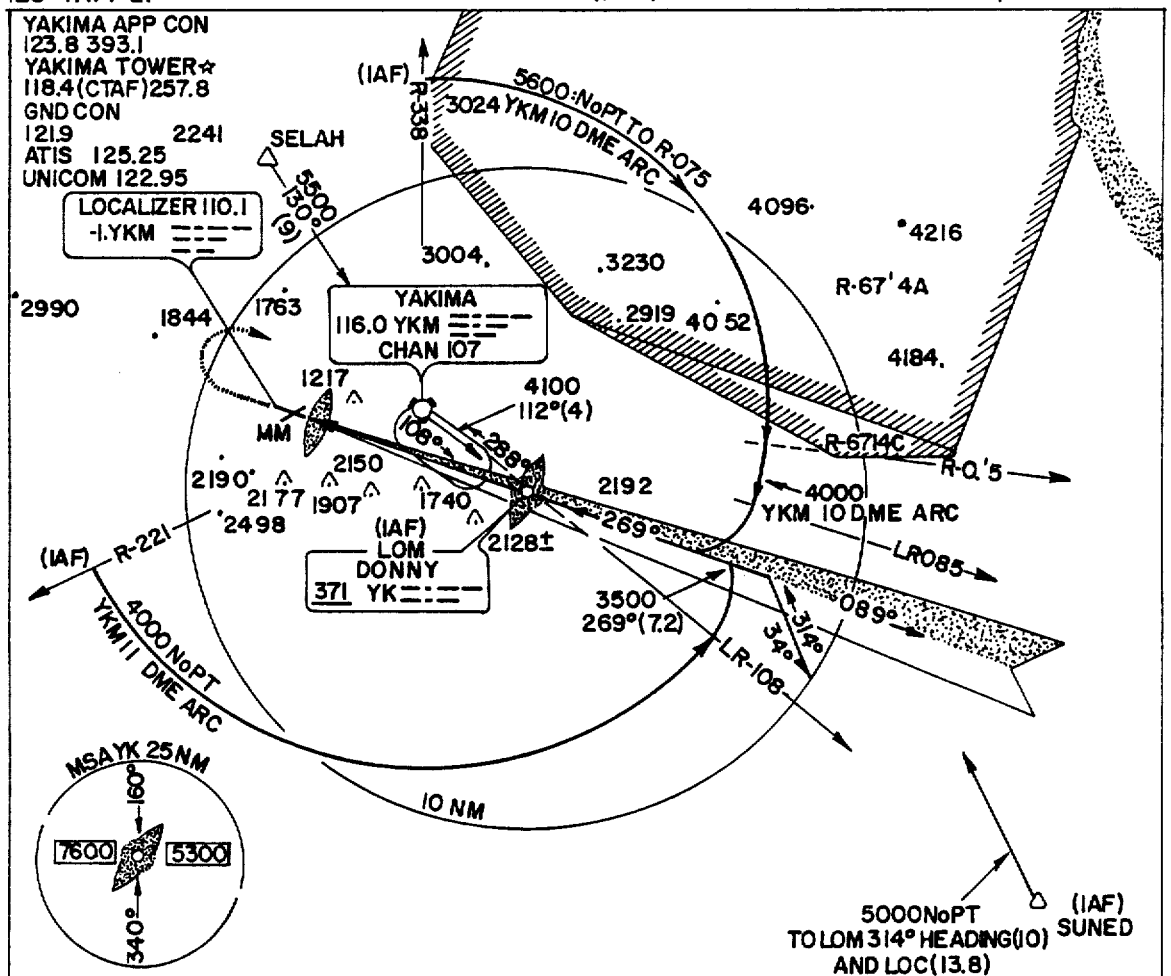
FIG. 5c is a sample approach chart generated in accordance with a preferred embodiment of the present invention.

The preferred embodiment of the present invention will be described below in terms of a flight planning apparatus and methodology which represents one embodiment of the varied navigational planning applications which may be implemented. The navigational planning applications, in turn, represent one embodiment of the varied, on-demand, portable mass storage, user-customized cartographic applications which may be implemented in accordance with the teachings of the present invention. The present invention is set forth in detail in the appended claims and as such is not necessarily limited to flight planning or air navigational applications and may be applied to other planning and customized, user-demand environments, such as seaboard navigation. The present invention generally provides intelligent apparatus which provides required information from a database in an output format having particular usefulness to the intended user. Accordingly, the following description of a preferred flight planning apparatus and method should be viewed as merely exemplary of the present invention.

In order to provide a thorough understanding of the preferred application of the present invention the definition of a number of terms and descriptions peculiar to air navigation is appropriate.

Generally, a flight route consists of at least a beginning point (an origin), a route and an ending point (destination). When a flight is to be made under instrument flight rules (IFR), it may be broken down into a number of parts: initial time, standard instrument departure (SID), departure transition, and route, standard terminal arrival route (STAR) or profile descent, approach transition, and approach. Each of these parts may be defined as a series of fix/course/fix segments, a fix being any geographical point and a course assumed to be a straight track across the surface of the Earth between two fixes.

The Federal Aviation Administration (FAA) in turn has defined SID, SID transition, STAR, STAR transitions and profile descent procedures for about 250 airports, as well as over 5,000 approaches at nearly 2600 airports. These definitions are published by the FAA in paper version on FAA Forms 8260. The National Ocean Service (NOS) and Jeppesen publish these defined routes and approaches on paper in graphic form as charts. Some of these routes and procedures may also be available in electronic format.

Standard instrument departure (SID) procedures branch into several routes, each of which terminates at a fix called a departure gate or SID exit. These fixes are points common to transition routes and to enroute airways. An airport may have several SIDs to accommodate departures in different directions. Each SID can accommodate several airports within a geographical area.

Standard terminal arrival routes (STARs) start from one of several fixes called entry or arrival gates. These fixes again are points common to enroute airways and STAR transitions. Transition routes merge into an instrument approach procedure to form the STAR. There may be several STARs for any one airport to accommodate traffic arriving from different directions, and each STAR may accommodate several airports within a given geographical area.

Profiled descents are similar to STARs except that they are designed to allow turbojet aircraft to make descents to airports at idle power to conserve fuel.

Most airports do not have published STARs. Instead, their instrument approach procedures start from initial approach fixes (IAFs). IAFs are points common to approach procedures and to enroute airways similar to STARs. For purposes of the present invention, an IAF may be treated the same as an arrival gate in a STAR procedure.

The enroute airways, referred to above, are defined by the FAA. In actuality, they comprise two distinct types: (1) a low altitude (below 18,000 feet) called Victor airways; and (2) high altitude (above 18,000 feet) called Jet routes. These airways are electronically published by both Jeppesen and the National Flight Data Center (FDC), but are available most commonly in chart form.

In contrast to the simplest routes referred to above in which an origin and a destination are designated with the route consisting of a straight line segment between the two, more complex routes may be defined by calling for Victor airways or Jet routes. These routes consist of fix/segment/fix/segment/fix . . . fix and terminate and begin at various STARs, SIDs and IAFs associated with origin and destination airports as explained above.

Whenever a pilot intends to fly a route under IFR, he must accumulate charts describing the STARs, SIDs, and IAFs for his origin and destination airports. He may also desire to have with him in flight similar data and charts for alternate airports, en route locations and waypoints. The IFR and the pilots may desire airport diagram charts and taxi charts.

FIG. 1 illustrates a block diagram schematic of the various components of a system for providing flight planning in accordance with the present invention which provides the information a pilot needs to prepare for an IFR or other flight and minimizes the paper shuffling and refiling, while also minimizing the risks of misfiling. More particularly, FIG. 1 illustrates a collection of input data from a variety of sources; navigation and communication, geographic and hydrographic boundaries, topographic, populated places, and cartographic information are combined through a database generation process 10 to provide suitably formatted information for storage on a database, such as a CD ROM 12. Flight charts 14 or other images may be processed to provide raster images by means of a photographic scanning and image generation process 16 to provide further inputs to the database generation process 10. Additionally, a document control system 18 may be provided to provide appropriate names for images generated by the generation process 16 in terms of the anticipated navigational application (such as STARs and SIDs for flight planning), so that they may be retrieved once they are stored on the database CD ROM 12.

Generally, navigation and communication information collected at a block 20 may be received from the N.F.D.C. upon request. Geographic and hydrographic boundaries shown at a block 22 may also be accumulated from various sources and generally provide definition of water and other geographic boundaries relevant to the flight planning operation. Topographic information shown at a block 24 may also be obtained from the U.S. Geographic Survey (U.S.G.S.) and other published sources. Similarly, the populated places information shown at a block 26 may be accumulated from the U.S. Geological Survey and provides locations of populated places. Cartographic information shown at a block 28 may provide important information such as landmarks and roadways. Additional information sources may be tapped to provide useful data such as listings of services available at individual airports or other locations, such as types of airplane fuel, rental cars and lodging.

Flight charts 14 may be acquired from any published source, such as Jeppesen and NOS, or other image-type data may be accumulated from appropriate sources (e.g., channel harbor charts). These published images are available in chart form and may then be photographically scanned line-by-line, and grey-scale to individual pixel processed using available digital image conversion software such as that marketed by Datacopy of California and others to generate raster images at a box 16 to provide serial data into the database generation process 10, which may be subsequently read out in serial form to generate a chart at the user output. Various data compression schemes may be utilized at this point or subsequently to allow for maximum information storage given the large number of white space on any chart. One such data compression technique which provides compatibility with current hardware is the CCITT international standard, Group IV, two dimension compression algorithm.

Alternately, the image-type data, such as the Jeppsen or NOS charts, may be processed to form vector based object data, or may be acquired in that form originally and stored directly. When this type of data or processing is utilized, object information about the image is stored rather than the image itself being stored. This may effect a further storage size reduction and can facilitate enhanced data processing in some applications.

The document control system 18 provides a control on the overall information process by providing names or identifiers, such as airport name, chart type or revision date to the generated raster images or data, which are useful and appropriate for flight planning decisions.

Referring now to FIG. 2, therein is shown a generalized flow chart for processing of the various input data segments received from blocks 20, 22, 24, 26 and 28 and the raster image generation process 16 in FIG. 1 to build a desired database. More particularly, each data record or segment is input at a block 30 in FIG. 2 for insertion in a navigational (NAVCOM) communication data storage area 32 in FIG. 1 as shown by block 32a in FIG. 2. The particular input data record is then evaluated at a decision block 34 to determine whether any geographical reference points are associated with that particular input data segment. In flight planning, as in most navigational situations, virtually every input data segment would have at least one geographic reference of latitude and longitudinal data. In the preferred embodiment, each input data segment is stored with respect to a 30'×30' latitude, longitudinal grid on the Earth's surface to form 1°×1° quadrants. If geographic reference points are associated with the particular data record, a geographic index 36 in FIG. 1 will be supplemented as shown by a block 36a in FIG. 2 and a pointer will be inserted in the geographical index 36 at each reference point to the particular data record in the NAVCOM database. The database generation process 10 then continues and analyzes the particular input data record at a block 38 to determine whether any name reference is associated with the particular input data record. If so then a B-tree, named access index 40 in FIG. 1 is supplemented to include a pointer to that data record in the NAVCOM database under the named reference as shown by a block 40a in FIG. 2.

The database generation then continues to a block 42 which determines whether this type of data record has images associated with it. If it does, for example an airport, STAR or SID data record, the raster image from the image generating block 16 is stored in a raster images database 44, and a pointer is then established at a block 48 to the stored raster image (or images) in raster image database 44 from the particular data record entry in NAVCOM database 32. The process then loops back to the next input data record and repeats, each time implementing, when appropriate, a pointer to the geographic index 36 and an additional pointer in the B-tree, named access index 40 to the particular data record in the NAVCOM database.

The information stored on the CD ROM database 12 may then be accessed in one of two fahions related to the format of the database 12. First, specification of a geographical location and reference to the geographic index 36 under a particular latitude and longitude will provide a navigational and communication data record at the NAVCOM database 32 in addition to the raster images stored at the raster image database 44 corresponding to the pointer from that particular latitude and longitude entry in the geographic index 36. Alternatively, reference to a name on the B-tree, named access index 40 may provide additional navigational or communication data as stored in NAVCOM database 32 and raster images as stored in raster images database 42 corresponding to the information retrieved by the pointer corresponding to that name on the B-tree index 40.

FIG. 2 described above generally illustrates a database building method in a preferred embodiment for use in conjunction with the apparatus of the present invention. Those skilled in data processing will recognize that many methods are presently available to do the actual data processing from raw input data received from the various sources illustrated in FIG. 1 to the single, formatted database illustrated as the database 12 in FIG. 1. FIG. 3 generally illustrates the logical steps of one method for production of a flight planning database in a preferred embodiment of the present invention.

As shown in FIG. 3, the raw input data collected at box 20, 22, 24, 26 or 28 in FIG. 1 is input at a starting point 50 in FIG. 3. The input data from input point 50 is then loaded by separate loading programs through a stage 52. In this step, each particular type of input data record, for example navigational and communication, is processed by a separate loading program keyed to the particular type of information in the particular raw input data being processed. That is, the particular format of the raw input data will govern the parameters of the loading program to ultimately provide the raw input data as a data record at the on-line storage block 54 in FIG. 3, in a format useful to the intended application, such as flight planning.

The database building sequence then advances to a block 56 at which the database is first built and indexed. This step is generally described in conjunction with the flowchart of FIG. 2. Once the building and indexing of the sequence in FIG. 2 has been completed, the particular data record may be compressed at a step 58 so that space is optimized within the data storage means based upon the type of data being stored. This simply is a comparison and optimization technique based on the data stored. For example, during the database building and indexing at step 56, B-tree references are generated in a sequential listing fashion with the appropriate pointers to the NAVCOM data record. However, for space minimization and optimal accessing time, the named access index may be arranged in a perfectly symmetrical B-tree in conjunction with the NAVCOM database and a geographical index at a step 60. This provides a very real savings in data storage space and accessing time. Until this point, the address locations for the data records and the indexes are relative. At this point, absolute addresses are established for individual data records and the B-tree and the geographical index with the appropriate pointers at a database formatting step 62. Correspondingly, images from the raster image generation block 16 of FIG. 1 are stored from a block 64 to provide a completed, formatted database which may be impressed on a CD master at a block 66.

The database building and indexing block 56 may be further understood in reference to the flow chart of FIG. 2. Generally, the building process starts with the raw input data and generates three files in the preferred embodiment, namely, NAVCOM (comprising data records and sequential B-tree listing), Pointer File (providing a cross-reference between data records and indexes) and a geographical index (which provides a listing of geographical reference points located in the database and appropriate pointers to at least a relative address). During this processing step, only relative addresses are utilized for ease of data processing. As explained at the database formatting step 62 of FIG. 3, absolute addresses on the CD will be established to provide for optimal accessing.

As will be recognized by those skilled in the art, the particular processing steps which comprise each of the logical levels in FIG. 3 will depend primarily upon the type of data received from the raw data source, for example, the navigational and communication information received at block 20 in FIG. 1.

In the preferred embodiment, navigation and communication information received at block 20 underlies the flight planning methods and apparatus. Accordingly, a description of the logic flow for processing the raw data may be considered exemplary of the type of processing for particular raw input data.

Initially, the navigational and communication data from block 20 is processed through the separate loading programs shown by block 52 in FIG. 3 to comprise a series of on-line direct access files at block 54 of FIG. 3. In the preferred embodiment these files comprise (1) airports, (2) runways, (3) fixes, (4) waypoints, (5) navaids, (6) airways and (7) airway segments. Each file at this stage has its own related data descriptive file and an index file.

Because of the consistency and completeness necessary for air flight planning, the on-line database is then further processed to identify and overcome particular problems so that it may ultimately be accessed in conjunction with the flight planner apparatus to provide accurate flight plan and navigational information to a pilot. For example, the airway segments may be sorted and analyzed, "fixes" may be matched to waypoints to identify particular waypoints, airports may be checked to identify those airports having no approaches or departures while having associated cities which do have approaches or departures associated with another nearby airport, and files may be checked to identify fields which do not fall between the designated minimum and maximum field lengths. Also, the airway segment file may be matched against the previously identified waypoints to determine the associated information which otherwise merely forms a part of an airway path and the fix file may be updated to identify all holding pattern fixes as recalled from a separate holding pattern file. As city information is loaded onto the on-line storage from the populated places block 26 of FIG. 1, the cities file may be checked and all obvious duplicate cities may be dropped and may be updated to modify or delete corresponding city records. The next step as indicated at block 56 and explained in detail in conjunction with the block diagram at FIG. 2 is to build the underlying information of the database (which may be referred to as a metabase, that is, a base which is to be further processed or undergo further transition).

Once this initial database has been completed, the data must be compressed as shown at the block 58 and final addresses resolved for location on CD master 66. In the preferred embodiment, this may be done in a three step process. The first step comprises a reading in of the metabase with all quadrant pointer records (corresponding to the selected 30′×30′ grid in each 1°×1° quadrant square) and data records compressed into adjacent addresses. While this is accomplished a translate table may be built which will translate the old address (a relative address) into the new compressed file address (an absolute address). As shown in FIG. 1, the font definition information 68, the form files 70 and the executables (system program) 72 may also be read onto their location of the CD database or other database being used.

The second step comprises reading in the pointer file and building the B-tree using the translate table to derive the correct address pointers. As previously mentioned, prior to this time the named access index consists merely of a sequential named reference listing which may be converted to the rapidly accessible, symmetrical B-tree format.

Once these two steps have been accomplished, the new compressed database may be scanned to translate all grid and quadrant record pointers to their absolute addresses using the translate table generated previously. The pointer file may then be read to resolve the addresses of all record pointers which are buried inside the records as generated in conjunction with the processing described in conjunction with FIG. 2. At this time, the actual images files may be read in and correlated with the airport information previously stored. The image director may be built and the actual image or appropriate object data loaded onto the designated CD database area.

The final step in the process is illustrated at block 66 in FIG. 3 in which the CD mastering tape is physically built. This may be done a number of different specifications. Currently, Sony and 3M (Minnesota Mining and Manufacturing Company) specifications are deemed to be acceptable although the preferred embodiment utilizes a Sony specification in conjunction with the Sony disk drive used in the preferred embodiment of the system hardware as described below.

The logical files in the preferred embodiment are generally similar and may comprise one or more physical files. For example, a data descriptive file may describe the fields in the data record (whether the field has maximum/minimum limits and then maximum and minimum limit of the field). Each record may then be keyed as desired. Other physical files may include an index file containing a master pointer list and actual pointer records.

These files are then processed in accordance with the discussion of the steps illustrated in FIG. 2 to provide the necessary steps of the database building illustrated in the flow chart of FIG. 3.

It should be appreciated that the foregoing description to the database generation process is intended to be exemplary in nature, without going into a line by line analysis of various programs which may be used to implement particular steps. This description, rather, is intended to highlight the significance of particular aspects of a data-record for use in the intended application. For example, navigational systems and planning utilize data which may be helpfully keyed to geographic location (latitude, longitude), but also may be desirably retrievable on a named basis. Accordingly, the database is formed with access to the individual data records available by both geographical and name reference, (in this embodiment by the use of corresponding indexes).

Other applications may make use of different items in each data record. Thus, the foregoing description merely sets forth one logical progression for generating a database having a format useful for navigational planning, specifically, flight planning. It is envisioned that other database generation and formatting techniques may be used with equal facility, as long as the database remains accessible to the system user on the basis of the type of reference which correlates the stored data to the particular user application.

Similar data processing techniques may be applied to other raw input data in conjunction with the overall processing format of FIG. 3 to provide for the complete database for the navigational timing apparatus. Different processing techniques will depend upon the type of information in the particular files and the degree to which that information is desired to be accessed by the user of the navigational planning apparatus.

It will be appreciated by the experienced pilot that this provides a unique, useful function for both preflight and inflight navigational planning; the pilot, or other user need only input a named reference point, such as an airway intersection, to receive all navigational information related to that name reference, including the geographical reference which may be used with on-board navigational devices.

Referring once again to FIG. 1, the bottom portion illustrates that the flight planner 72, in response to user inputs, may access the database through the geographical index 36 and the B-tree, named access index 40 to provide selected flight charts 76 and an appropriate trip confirmation and FAA flight plan 74. Additionally, the information stored on the database 12 may be processed in conjunction with the geographical and B-tree, named access indexes to provide a local chart 78 and, in conjunction with origin and destination information provided by the user and additional processing of the navigational and communication data on the database 12, a trip, strip chart or charts 80 as shown.

In operation, when the flight planner system is turned on, the system undergoes a booting operation or process similar to that for any computer having a mass storage device associated with it. At that point, the system displays a menu to the user and in response to the user selection branches to an appropriate operational routine. This basic operational logic flow is illustrated in FIG. 4 in which "system power on" is illustrated in a block 82, the system boot step is shown at a block 84, the display menu step is shown at a block 86, and the four modes are listed in a branching block 88, namely flight planning, chart requests, setup and utilities. These or other selections are displayed for the user in response to the power-on operation. The user then selects, by means of a keyboard cursor or otherwise, one of the operational modes and the system then branches to the selected routine.

Referring now to FIG. 5, therein is illustrated a logical flow chart of the process steps when the user selects the flight planning mode. The first step in the flight planning mode as shown by a block 90, comprises a menu prompt to the user with an internal editing function. This is a text editor function which fills in the information boxes on an FAA approved flight plan and additional boxes as may be desired in particular flight planning or other navigational planning systems. In a preferred embodiment, the display at the keyboard provides menu prompts for each of the segments of the FAA flight plan. The user then types in the appropriate information, e.g., origin, destination, route, in the field provided to form a formatted text string. This information may then be stored and provided in the output generation of the appropriate trip kit.

Once the necessary information has been inputted in addition to such other information as may be desired, the user signals the end of the edit function (for example, by depressing the return key on a keyboard) which causes the system to move on to the flight plan parse function illustrated at a block 92 in FIG. 5. At this stage, the system undergoes a syntax check on the edited flight plan information provided as a text string by the user in response to the menu prompts at block 90. To provide this checking, the system builds an internal structure of location plus path culminating at a location to ensure that the user has specified an appropriate path for travel between the locations identified. If there are errors in the syntax, the menu prompts reappear with the appropriate instruction to the user for modification and the system returns to the edit mode at the block 90 for further processing. Once a substitute input is provided by the user and the edit mode terminated, the system returns to the flight plan parse block 92. Once a syntax check has been completed without error, the system advances to a semantics checking operation illustrated at a block 94 in FIG. 5. During the semantic checking program, the system goes to the database 12 illustrated in FIG. 1 to fill in whatever gaps may be present in the flight plan or in the anticipated trip kit generated flight plan. For example, if distance is not specified between origin and destination in the flight plan as inputted by the user, the system will provide a calculation of the distance and insert it in an appropriate location in the flight plan. Additionally, at this time the system checks to see if a real path has been defined over the earth. In this step the system determines whether the travel path indicated by the flight plan information provides an actual path between two points on the surface of the earth or whether the points are not within the earth as defined on a database. Additionally, the system checks for duplicate or redundant origin or designation names to insure that the proper destination and origin have been designated by the user in terms of their identification within the database.

Once these computing type steps have been completed during the semantic checking operation at the block 94, the system advances to the output generation illustrated at a block 96. In this step, the system trips to a separate program to generate the desired trip kit. In the preferred embodiment, the trip kit includes a trip confirmation chart which provides a graphical representation of the proposed flight path between origin and destination with an indication of a reference direction, such as true north. The trip confirmation chart also provides a standard FAA flight plan with some additional useful information and flight plan assumptions, some of which may have been filled in by the computing step illustrated at block 94 above.

FIG. 5a illustrates a sample trip confirmation chart generated in accordance with a preferred embodiment of the present invention. As shown in FIG. 5a, a flight is to be flown from Minneapolis (KMSP) to Los Angeles (KLAX). A number of waypoints, including Denver (DEN), are illustrated in the flightpath which is shown to be along airways J114, J60, J80, J9 and J107. This provides a graphical representation to the pilot of the route to be flown with an additional indication of magnetic north as shown by the north arrow symbol.

Additionally, a rough scaling is provided so that the pilot may keep track of his approximate progress along the flight. In the bottom portion of the trip confirmation chart of FIG. 5a is shown the FAA flight plan referred to above and various flight plan assumptions. It is anticipated that the sufficiency of this information will satisfy the necessary FAA requirements for flight plan filing and may be provided then on an automatic basis in response to the textual information provided by the pilot and the menu/edit functions illustrated at block 90 in FIG. 5. It should be appreciated that the chart of FIG. 5a is merely exemplary in nature and of course will change for given destinations, origins and routes. Also, the particular information provided in the textual portions may be modified or otherwise customized to particular applications.

Also, at this time the system retrieves and generates the stored raster images of the various image charts, e.g., departure-related charts for the origin location, the approach-related charts for the destination location and possibly approach and departure charts as necessary for designated alternate airports along the route.

Figure 5D:
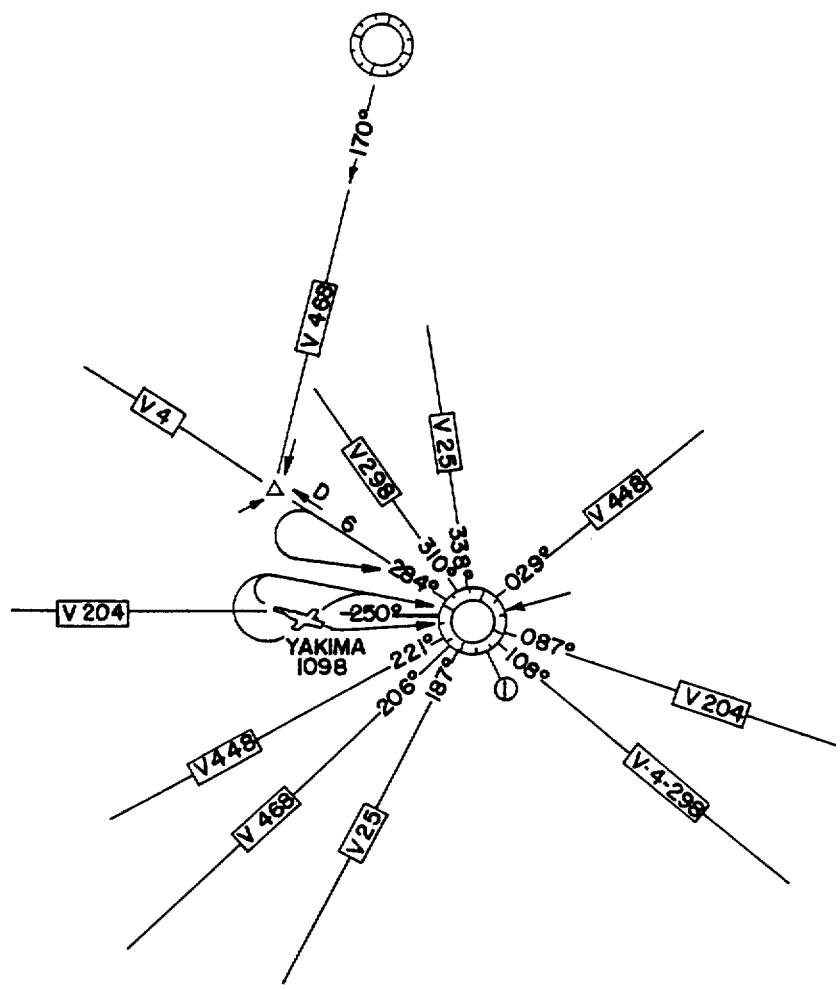
FIG. 5d is a portion of a sample departure chart generated in accordance with a preferred embodiment of the present invention.

FIGS. 5b, 5c and 5d generally illustrate typical charts which may be printed out at this point. Specifically, FIG. 5b illustrates an airport diagram for Yakima Air Terminal in Washington state. This type of diagram clearly illustrates the runways and possible taxi routes for incoming and outgoing airplanes. Additionally, as shown by the chart, runway elevations, heading and lengths are shown. This type of information is desirable for both departing and incoming pilots. FIG. 5c illustrates an approach chart for an ILS landing at runway 27 at the Yakima air terminal. Again, this type of information is essential to the pilot making instrument approaches to Yakima air terminal and is required by the FAA for all pilots flying under IFR. Typically, a pilot will accumulate approach charts of the departing airport, in case of an emergency turnaround, and for the destination airport for the scheduled approach. This type of chart shows headings, elevations, profiled descents and radio communication centers. In the lower right-hand corner also is illustrated a concise airport representation. FIG. 5d illustrates at least some of the basic information typically shown on a departure chart, also for Yakima Air Terminal. As shown, departing routes and orientations to particular radio communication centers are shown for the departing airplane.

FIGS. 5b, 5c and 5d illustrate the typical information which may be printed in chart form for pilots. The same type of information is available now from paper oriented services as described above. Experienced pilots will recognize that FIGS. 5b and 5c are copies of NOS charts which are available to the public from that government agency. FIG. 5d is a representation of the basic information which may be made available either by the NOS or Jeppsen as mentioned previously. Both NOS and Jeppsen publish all necessary charts which a pilot needs for navigation under IFR or other conditions. Either source may be utilized to provide the foundation for the database and ultimate retrieval by the system user. Additionally, although these charts are stored in the preferred embodiment by raster scanning and storage of the entire image, they may be provided from object data to provide the same type of finished output product.

The experienced pilot will recognize that FIGS. 5b, 5c and 5d are merely exemplary of the charts which would be printed out for each airport. That is, typically an approach chart will be printed for each approach to a given airport, although they may be customized for particular airplane types. Similarly, multiple departure charts may be presented for each airport and runway. Likewise, airport diagrams and taxi charts will typically be provided for both departure and arriving airports as well as for any alternate airports designated along the way.

The system then prints out these charts in a sequential form, which in the preferred embodiment begins with the trip configuration chart and continues with all charts associated with the destination airport, then any alternate waypoint airports, then the arrival airport and finally any alternate arrival airports. In the preferred embodiment, these charts come as $5\frac{1}{2}" \times 8"$ perforated sheets from a thermal printer having a high resolution printhead.

Additionally, as mentioned above in conjunction with the explanation of FIG. 1, some embodiments may provide strip charts in conjunction with the trip kit, which provide valuable information about various locations encountered along the designated flight path between origin and destination. FIG. 5e illustrates one embodiment of a strip chart illustrating a flight between Denver (KDEN) and Colorado Springs (KCOS). As shown on the chart, the originating airport, Denver, is shown along with the destination airport, Colorado Springs. In addition, a waypoint, shown as a four-sided star, is illustrated in addition to various radio communication navigational aids which may be encountered by the pilot along the flight route. Further, additional airports within a given distance of the flight path, for example 50 miles, are shown as small circular rings. The experienced user will note that the radio communication NAVAIDS, for example Kiowa, are shown in their typical rose fashion with a magnetic north indicator shown by the arrow. Those NAVAIDS specified to be used for navigation by the pilot are shown with their 0, 90, 180 and 270 degree radial arms extending to intersect the flight path. Through this, the pilot may chart his navigation through particular vectors from NAVAIDS and associated distances. Additional information may of course be provided in the strip chart or it may be simplified depending upon the particular application envisioned for the system. At present, there is no commercial source available for customized strip charts as shown in FIG. 5e. Accordingly, the charts must be generated from object data within the database.

This is accomplished in the preferred embodiment by analyzing the input data provided by the user. For example, the originating, destination and waypoint information is processed as shown in the confirmation chart of FIG. 5a. The system looks at the input information and goes to the database to determine the route between the designated points, whether they are origin/destination or origin/waypoint or waypoint/destination or even waypoint/waypoint. The processor of the system may then look at each geographic quadrant or data record which will be encountered upon the path between the given points. The information in that data record may then be scanned to see whether it contains information relevant to the inquiry for generation of a trip confirmation chart or a strip chart as shown in FIG. 5e. If such information is contained in the data record, a graphic symbol is placed at the appropriate geographic location on the chart being generated. For example, the NAVAID Kiowa is encountered within a given distance of the anticipated flight path between Denver and Colorado Springs. Accordingly, the appropriate symbol for a NAVAID, the rose-type symbol shown, is generated at the appropriate distance from the flight path between those two cities. Such other associated information which may be valuable to the pilot may also be provided as an output from stored information in the data record. For example, the true north arrow at the NAVAID, the textual definition of its location and name maybe printed alongside. Similar applications are shown with the circular graphic symbols for additional civil airports encountered along the route with an identification of their name, for example KBKF. As anticipated, further textual information may be provided in conjunction with these graphic symbols, for example, runway length and type of navigational equipment available at the particular airport. These charts are generated through the use of a graphic compiler which compiles the graphic symbols representative of the data stored in each particular data record which has been filtered out as containing information desired to be printed on the particular chart being compiled.

Figure 5F:
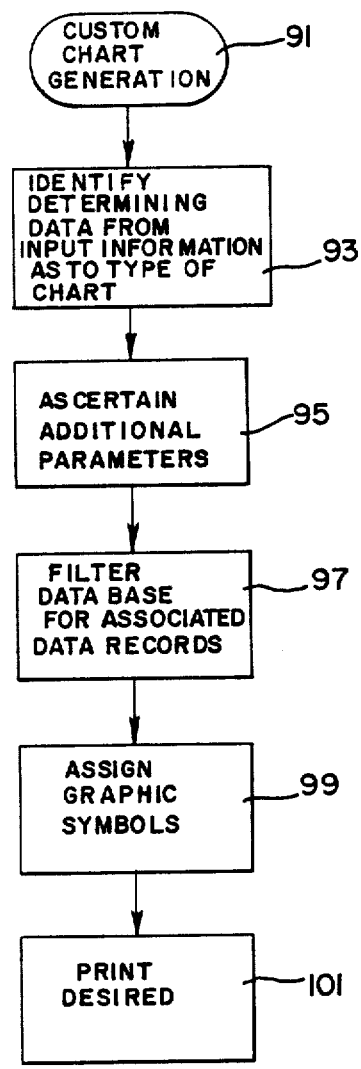
FIG. 5f is a logic flow chart representation of a customized graphic chart generation in accordance with a preferred embodiment of the present invention.

FIG. 5f generally illustrates the logical progression in a flowchart fashion for the generation of custom charts, such as the trip confirmation chart and the trip, strip chart described above and also the local chart which will be described below. Specifically, when a custom chart generation is selected at a block 91 by the designation within the defined trip kit package or otherwise under the request charts mode discussed below, the system determines at a block 93 whether the chart is to be a trip confirmation chart, a trip strip chart, a local chart or other chart. The system then looks at the definition of that chart to determine what additional parameters are necessary at a block 95. That is, for a trip confirmation chart the system will determine that designation of origin, destination, route and waypoints (if any) are necessary in addition to a true north indicator and a printout of the FAA flight plan and the flight plan assumptions as illustrated in FIG. 5a. For the trip strip chart, the system will ascertain that in the preferred embodiment, a graphic representation of the origin and destination airports as well as the flight route and any designated waypoints must be provided. Additionally, navigational aids and airports encountered along the route or within a given distance, for example 50 miles, of the route, must also be found. For the local chart, discussed below, the system ascertains that the given geographic or named reference must be illustrated in a graphic form in addition to airports and possibly NAVAIDS or other information within a given distance of the specified location, for example, 50 miles. Each portion of the requested information must then be provided in a graphic form with whatever textual information may be further necessary. The system then advances as shown at a block 97 at which time each data record falling within the appropriate geographic definitions, for example within 50 miles of the designated location of the local chart or within 50 miles of the flight route for a trip strip chart, is identified. Those data records are then filtered to determine which ones contain the information desired to be provided in graphic form. A corresponding review of those data records containing the information to be printed in graphic form is accomplished to pull such textual information as may be desired to identify the graphic symbol, for example airport name or NAVAID name and location. Next, at a block 99 the system assigns graphic symbols in relation to the other information to be provided on the chart, and the chart is then printed as shown at block 101 in FIG. 5f with the graphic representation provided at the appropriate representational chart location with such textual information as may be desired to appropriately identify the symbol, for example airport or NAVAID.

Referring now to FIG. 6, therein is shown a block diagram, logic representation of the trip kit generation sequences described above. As shown in FIG. 6, the type of chart sequence in the trip kit generation controls the system operation for generation of the printed outputs. For example, for the trip confirmation chart which is an overview of the flight path, the described graphic compiler process shown as a block 100 must be used in addition to stored flight plan information illustrated generally by block 102 and database information shown on block 12 representative of the database 12 illustrated in FIG. 1. Thus, in response to a trip confirmation chart sequence start from block 104, the graphic compiler utilizes the stored flight information and the stored database information to provide the customized trip confirmation chart. Similarly, the system may provide a trip, strip chart as shown at a block 106 utilizing the same type of information processing to provide a different customized chart output. Correspondingly, other customized chart outputs may be provided as desired for the particular navigational application.

Also illustrated in FIG. 6 is the generation of the stored image charts, such as the approach and departure charts, at a block 108. The system responds to a sequence start signal from the sequence start block 104 to retrieve stored flight plan information in its internal representation form as shown at the block 104 and stored database information from the database 12 to print out the stored images of the approach, departure, alternate airports, taxiways, SID stars and other pure stored images charts. As most of these charts have been compressed during their storage, a decompression routine is typically utilized in conjunction with the printout or at the data transfer stage.

Alternately, the stored images may be in object form. In that case, the system could operate in much the same way as described in FIG. 5f to provide the desired image data.

When the user selects the second of the menu prompted routines illustrated in block 88 in FIG. 4, namely, chart requests, a procedure is followed as illustrated in FIG. 7. In FIG. 7, the chart request mode is initiated at a block 110 and the user advances immediately to an edit menu function 112, at which in response to menu prompts as to the type of charts available, the user provides named references in the appropriate field. It will be appreciated that a certain hierarchy of chart request prompts to the user may be necessary. For example, if the user specifies runway charts at a particular airport the system may inquire as to whether he wants ILS or other runway charts. Once the user has selected specific, named charts as desired, the system advances further. If the named charts represent stored image charts on the database 12, the system advances as shown at a block 114 to retrieve the stored raster images or object data from the database 12 and provide printouts of the named charts. However, if the user identifies or requests a local chart, which comprises a compilation of symbolic data for a given radius surrounding a specified geographical fix, the system utilizes a graphic compiler 100a in FIG. 7 corresponding to the graphic compiler 100 in FIG. 6. The graphic compiler 100a interacts with the database 12 to retrieve and analyze the appropriate information within the given local area surrounding the geographical fix. The compiler then assigns the symbol to particular data records, such as airports, and provides the information in a chart form at a block 116. The symbolic representation on the local chart then comprises a graphic representation of the information within the database without actually printing out the stored information. This is in contrast to the typical, approach, departure and runway charts which are made available to the user at the block 114. It will be appreciated that a certain filtering function is associated with the generation of the local chart to define the given geographical radius and analyze the database for information contained within that radius. This type of custom chart generation is shown generally by the logic flow chart of FIG. 5f. Further refinement may be made to this type of process to allow for the selection of only certain types of data within the geographical radius as stored in the database.

FIG. 6a illustrates a general representation of the type of local chart which may be provided in this mode of system operation. Generally, a particular geographic location is represented in the center of the chart as shown by a symbol 117 in FIG. 6a. This symbol represents the location of Denver, Colo., which was the identified local area to be analyzed. As explained in conjunction with the logic flowchart of FIG. 5f, the system analyzes the various data records for each geographic location within a given radius of Denver, Colo. to identify all other airports (shown as small circles in FIG. 6a) located within that radius. The system then provides a graphic symbol at the representational location and direction from the center symbol 117. For example, the airport immediately to the left of the symbol 117 will be identified as KDEN, Stapleton International Airport, Denver, Colo., and having a runway length of 4,000 feet. The other airports identified on the local chart may be similarly identified by a textual box as shown graphically in FIG. 6a. Further types of data records may be identified, if desired, and additional textual information may be provided depending upon the particular application. The type of local chart illustrated in FIG. 6a provides a particular brand of meaningful information to the user. That is, a person flying to Denver for the first time may simply specify the fact that he is going to Denver and print out a local chart of the Denver area. The chart then identifies airports within a given radius of the desired destination and provides some meaningful information about them, for example runway length. The user may then select the airport which best fits his needs and designate it as the destination airport in generating his trip kit. The trip kit, which may include a trip strip chart, then prints out all necessary navigational information for the path terminating at the desired airport.

It will be appreciated that the operation of the flight planner 72 of FIG. 1 revolves around two conceptual products, namely forms and queries. Forms are canned definitions of what a particular output is to look like. Typically, any particular form may be divided into a number of windows along with the window size for each along with the symbols or information to be included in each window. The queries, also a canned or predefined product, then define particular formulas on where information in a particular window is to be acquired from, how it is to be processed and how it is to be printed. For example, the trip confirmation chart of FIG. 5a comprises three windows. The first being the label "trip confirmation chart" which may be merely a label without reference to the data base. The second window comprises the trip or illustrated route between destination and origin. In this window, queries would direct the processor to pick off information from the user input as to destinations, routes and origin. Additionally, queries would direct the processor to review the associated data records in the database to establish the orientation between these items and also to establish the orientation for the magnetic north symbol indicated. The final window comprises the FAA flight plan and flight plan assumptions. The queries associated with each of these windows would direct the processor to review the inputted text train from the user in addition to the system computed text and provide them in the window as shown.

The typical charts illustrated by FIGS. 5b through 5d may be more easily defined as a single window into which the image data record and associated textual information is to be provided from the database. Alternatively, separate windows may be defined for particular graphic symbols or textual information. The form definition and queries may be stored in conjunction with the overall system program as shown on the database 12 in FIG. 1. These queries may be thought of as merely asking questions of the database. By utilizing canned queries, all preprocessing of the syntax may be done at the initial database construction time which makes for in-field and portable processing on a more rapid basis. Alternatively, ad hoc queries may be utilized, but it is expected that at least some processing time trade-offs must then be made.

In the system operation, the user inputs define the forms to be processed. The forms then define which queries are evaluated. Some queries may require the system to process a hierarchy of information. In this situation, nested queries may be utilized, for example, to separate the airport information into runway information, airport layout information or approach and departure information. It will be appreciated by those skilled in the art that queries may be nested to whatever degree may be desired.

When the user selects the third mode of operation illustrated in block 88 of FIG. 4, namely, "set-up", he answers a series of menu prompts to provide information for storage in the system. This information typically comprises an identification of the aircraft and its type and color, the TAS, the pilot along with his address, telephone number and home base, the aircraft speed, fuel burn and fuel reserve. These inputs typically do not change from one flight plan to the next when the navigational apparatus is utilized by a single pilot in conjunction with a single aircraft. Accordingly, it may be stored in any non-volatile storage means and need not be inputted each time a flight plan (mode 1 in block 88 of FIG. 4) is initiated. This information may then be utilized in conjunction with the generation of the trip kit and the associated charts and flight plans.

When the user selects the fourth mode of operation illustrated in block 88 of FIG. 4, namely, "utilities", various functions may be made available to him. For example, maintenance and other utility type functions may be made available through this fourth mode or additional modes may be added to the menu prompting. One utilization of this feature would allow for the receipt of real time data input, for example, weather. This information may be stored and then provided in conjunction with flight plan or chart information in appropriate user compatible form, possibly by means of a graphic compiler process described in conjunction with FIG. 5f, to provide charts such as in a box 118 in FIG. 1.

Referring now to FIG. 8, therein is illustrated, in block diagram form, a hardware layout for the preferred embodiment of the present invention. Specifically, the apparatus of FIG. 8 provides a portable, on demand publishing system for flight planning and navigational application. It is envisioned that virtually the same apparatus may be utilized for providing additional navigational system equipment depending upon the operating system utilized and the information provided in the database. Referring specifically to the illustrations in FIG. 8, a compact disk data storage base 12 is illustrated in the upper right hand corner. The database 12 interacts with other components by means of an extensive bus network 200. Direct memory access may be provided through a DMA control 202 having an associated RAM section 202a. A central processing unit 204 controls the overall system operation in accordance with a system operating program stored on an internal PROM 206 and the executable program 72 (FIG. 1) stored on the compact disk 12. Illustrated with PROM 206 is a PROM card 206a which may provide for some modifications and additional embodiments. In operation, a user provides information to the system by means of a keyboard 208 or other suitable input device. This device interacts with a serial input output (I/O) control circuit 210 to provide information to a volatile RAM memory 212 and also selected information to a static RAM memory 214. The static RAM memory 214 has associated with it a battery backup 216 to provide necessary power and non-volatile characteristics when the power is otherwise shut down to the overall system. In conjunction with this portion a real time clock 218 may be provided for real time reference.

In response to user inputs at the keyboard 208, the serial input-output (I/O) device directs the DMA control 202 to retrieve the appropriate stored information from the database 12 and provide that information either to the volatile RAM 212 for processing by the CPU 204 or directly to the printer for output. A RAM section 202a of the DMA control 202 provides for batching of the information from the database 12 through the DMA transfer function to provide full chart information to a printer 220 in a single pass. The printer may then indicate to the DMA control 202 when a particular printing function is completed and a subsequent printing function may be initiated. Control lines 222, 224 and 226 are illustrated to show generally the flow of control information.

Static RAM 214 stores the information which may be entered during the set-up mode discussed above and illustrated as the third mode in box 88 of FIG. 4. The CPU 204 is also sensitive to the information keyed in at the keyboard 208 to provide to the static RAM 214 the same type of information in the flight planning mode to provide for proper processing of that information in conjunction with the flight planning generation. Thus, the CPU 204 may override at least some of the stored information in the static RAM 214 during a subsequent flight planning operation without need for a further set-up mode operation.

Also shown in FIG. 8 is a modem 228 in conjunction with an automatic dialer 230 which may provide the real time or other information. It is envisioned that weather information or other real time information may be made available by means of phone lines. Several weather reporting systems are currently available. The information from such sources may be utilized in systems made with the techniques of the present invention merely by converting it to a format compatible with the system database and operational characteristics.

Each of the devices illustrated in FIG. 8 may be purchased or constructed from off the shelf items. For example, the CPU may be any available microprocessor unit depending upon the type of navigational planning to be implemented and the rate of information transfer desired. In the current preferred embodiment, a Motorola 68000 microprocessor is utilized. Correspondingly, the compact disk 12 may be utilized in a standard model 5000 Sony compact disk drive. Although not illustrated in FIG. 8, a power supply is obviously necessary to provide the necessary energy to drive the system. It is envisioned that any suitable computer rated power supply, possibly of a switcher type for accommodating varying local power systems, may be utilized. For example, Conver Electronics of Cupertino, Calif. manufactures and provides such supplies. In the flight planning application, it is viewed as desirable that the power supply be compatible with the standard 24 volt DC supply typically available on aircraft so that the flight planning apparatus may be utilized in the in-flight, in-cockpit environment. The volatile RAM 212, the PROM 206 (and 206a) and the static RAM 214 comprise typical off the shelf chips available from Intel, Motorola or other manufacturers. The size of the particular memory structure depends upon the amount of information or processing to be utilized in any given application and is not deemed crucial. Similarly, the real time clock 218 and the battery backup 216 may be purchased off the shelf to be compatible with the other elements of the system. The modem 228 and the dialer 230 may be purchased off the shelf from a number of vendors depending upon the particular data transfer applications envisioned and the information network to be accessed via the phone line. The keyboard 208 in the preferred embodiment comprises a standard Brother Electronics, QWERTY, keyboard with a 2 line×40 character LCD crystal display. This interfaces with a standard serial I/O chip 210 which may be purchased from available vendors. The printer 220 may comprise any acceptable printer for providing the desired output. In the preferred embodiment, a high resolution thermal printer was desired because of the degree of detail in the typical approach and other air navigation charts. Accordingly, a Sharp Electronics C216-95CH, 240 plus dot per inch resolution printhead was utilized. Printer driver paper advance electronics depend upon the application to be utilized and the chart length or other printout length. None of the actual components is deemed to be crucial to the operation of the present invention.

One of the features of the present invention is deemed to be in the provision of a portable navigational planning apparatus. Accordingly, the assembly of the components illustrated in FIG. 8 must be taken with a view to minimizing cost, size and weight. Any acceptable cabinetry may be utilized depending largely upon aesthetic considerations although a certain amount of rigidity should be achieved to provide for acceptable wear and tear. Presently, titanium casing is viewed as the best application although aluminum provides for a more cost effective casing. Any cooling functions to be implemented will depend upon the particular components selected and will depend in large part on the printer utilized.

The present invention has been described above in terms of a preferred embodiment, namely, on-demand flight planning. Those skilled in the art and familiar with the teachings of this application will recognize that other on-demand embodiments may be implemented, such as seaboard navigation and electrical network maintenance. Accordingly, the scope of the present invention must be viewed as being defined in appended claims and such modifications and further embodiments may be deemed to be within the spirit and scope of the present invention.

What is claimed is:

1. Navigation planning apparatus comprising:
   input means for entering selected navigation planning data;
   output means for sorting, selecting and providing navigation plan information to a pilot;
   storage means for storing navigation-related data in a selected format as a database;
   processor means for generating user prompts at said input means to prompt a user to input said navigation planning data in a preselected format and responsive to said input data to sort, select, and access data in said database in storage means to generate said navigation plan information at said output means; and
   said input means, data storage means, including said database, and processor means being contained within a common, portable package.

2. The method of claim 1 wherein:
   said preselected format of said database includes referencing said navigation information by alphanumeric symbols indicative of airports and radio communication centers and sorting, selecting and providing flight navigation information associated with said airports and radio communication centers.

3. The portable navigational planning apparatus of claim 1 wherein said navigation-related information comprises cartographic, topographic, geographic and navigational aid information and wherein said navigation plan information for output comprises a combination of said cartographic, topographic, geographic and navigational aid information.

4. The portable navigational planning apparatus of claim 1 wherein said navigation-related data comprises at least approach and departure charts associated with a plurality of airports and wherein said processor means prompts a user to input an identification of at least departing and arrival airports, whereby said navigation plan information for output then comprises approach and departure charts associated with said departing and arriving airports.

5. The portable navigational planning apparatus of claim 4 wherein said navigation plan information further includes strip cartographic information particular to a path between said departing and arrival airports.

6. A method for providing flight plan information at remote locations comprising:
   storing flight data including at least approach and departure charts as a database in compact, portable storage means in a preselected format;
   providing user prompts to prompt the user to input planning data corresponding to said selected format;
   sorting, selecting and accessing data in said database said storage means to retrieve selected portions of said flight data in response to said prompted user inputs; and
   processing said input planning data in conjunction with retrieved portions of said flight data to provide flight plan information, including approach and departure charts, corresponding to pilot needs.

7. A method for providing navigational information at remote locations including airborne locations comprising:
   storing a database comprising selected navigational data in compact, portable storage means in a preselected format;
   providing user prompts in conjunction with said portable storage means to prompt the user to input planning data corresponding to said preselected format of said database;
   sorting, selecting and accessing data in said database in said storage means to retrieve selected portions of said navigational data in response to said prompted user inputs; and
   processing said input data in conjunction with said retrieved portions of said navigational data from said database to provide navigational plan information to a pilot at said remote location.

8. Portable navigational planning apparatus comprising:
   compact data storage means for storing flight path and approach chart information in a data base;
   user input means associated with said data base for entering planning data and sorting and selecting data in said data base;
   output means for providing a user with selectable navigational information from said database;
   processor means for providing user prompts to said input means to prompt a user to input selected planning data in a preselected format and responsive to said input data to retrieve at least a predetermined array of flight path and approach chart information; and
   means for generating an output display including a cartographic representation of the flight plan and cartographic displays of the appropriate terminal approach charts.

9. Portable navigational planning apparatus comprising:
   compact data storage means for storing a data base comprising selected navigational information;
   user input means associated with said compact data storage means for entering planning data and for sorting, selecting and accessing data in said database.
   output means for providing a user with selectable navigational plan information from said database; and
   processor means for providing user prompts to said input means to prompt a user to input selected planning data in a preselected format and responsive to said input data for accessing said data storage means to retrieve at least a predetermined array of navigational information from said database in a selected pattern for output, providing said patterned navigational information at said output means and processing said input information to provide associated information unique to said input data at said output means to a user in conjunction with said navigational information;

said data storage means, including said database, input means, output means and processor means being contained within a common, portable cabinet.

10. The apparatus of claim 9 wherein:
said processor prompted inputs comprise at least origin and destination data; and
said processor is responsive to said origin and destination data to sort and retrieve selected flight navigation charts of said navigational data from said database said data storage means and to generate strip information particular to a path between said origin and said destination at said output means based on navigational information from said database.

11. The apparatus of claim 2 wherein said strip information includes cartographic information particular to a path between said origin and said destination.

12. The portable navigational planning apparatus of claim 9 wherein said selected navigational information comprises cartographic, topographic, geographic and navigational aid information and wherein said patterned navigational information for output comprises a combination of said cartographic, topographic, geographic and navigational aid information.

13. The portable navigational planning apparatus of claim 9 wherein said selected navigational information comprises at least approach and departure charts associated with a plurality of geographic points and wherein said processor means prompts a user to input an identification of at least departing and arrival airports, whereby said selected pattern of navigational information for output then comprises approach and departure charts associated with said departing and arriving airports.

14. The portable navigational planning apparatus claim 9 wherein said selected navigational information is provided, at least in part, by said output means in a cartographic format.

15. The portable navigational planning apparatus of claim 9 wherein said selected navigational information is provided at least in part, by said output means, in a cartographic format representing en route geography.

16. The portable navigational planning apparatus of claim 9 wherein said selected navigational information is provided at least in part, by said output means, in a cartographic format representing en route geography and representing destination information.

17. The portable navigational planning apparatus of claim 9 wherein said selected navigational information is at least in part related to latitude and longitude and said selected navigational information is presented, at least in part, in a cartographic format.

18. The portable navigational planning apparatus of claim 9 wherein said selected navigational information is provided to the user in a selected, patterned sequential output of navigational information.

19. The portable navigational planning apparatus of claim 9 for flight planning including means for generating a flight plan conforming to filing requirements of a regulatory agency.

20. The portable navigational planning apparatus of claim 9 for flight planning including means for storing, retrieving and graphically displaying terminal approach information.

21. The portable navigational planning apparatus of claim 9 for flight planning including means for modifying a navigational log and graphically displaying modified trip information while in flight.

* * * * *